(12) United States Patent
Maruyama

(10) Patent No.: US 11,699,937 B2
(45) Date of Patent: Jul. 11, 2023

(54) BLOWER

(71) Applicant: SHINANO KENSHI KABUSHIKI KAISHA, Nagano (JP)

(72) Inventor: Yohei Maruyama, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 77 days.

(21) Appl. No.: 17/380,300

(22) Filed: Jul. 20, 2021

(65) Prior Publication Data

US 2021/0351659 A1   Nov. 11, 2021

Related U.S. Application Data

(63) Continuation-in-part of application No. 15/863,173, filed on Jan. 5, 2018, now abandoned.

(30) Foreign Application Priority Data

Feb. 3, 2017   (JP) .................................. 2017-018694

(51) Int. Cl.
*H02K 5/24*     (2006.01)
*F04D 29/053*   (2006.01)
(Continued)

(52) U.S. Cl.
CPC ........... *H02K 5/24* (2013.01); *F04D 25/0606* (2013.01); *F04D 29/053* (2013.01);
(Continued)

(58) Field of Classification Search
CPC ........ H02K 5/24; H02K 1/185; H02K 5/1732; H02K 7/04; H02K 7/083; F04D 17/08; F04D 25/06; F04D 25/0606; F04D 29/053; F04D 29/281; F04D 29/4206; F04D 29/668; F04D 17/16; F04D 29/40; F04D 29/4226; F04D 29/059
See application file for complete search history.

(56) References Cited

U.S. PATENT DOCUMENTS

| | | | |
|---|---|---|---|
| 2003/0006660 A1* | 1/2003 | Kehrer ................... | H02K 1/185 310/90 |
| 2006/0082234 A1* | 4/2006 | Tsukamoto ............. | F04B 17/03 417/423.14 |

(Continued)

OTHER PUBLICATIONS vocabulary.com/dictionary/adhere; adhere—Dictionary Definition _ Vocabulary.com pdf (Year: 2021).*

*Primary Examiner* — Kenneth J Hansen
*Assistant Examiner* — David N Brandt
(74) *Attorney, Agent, or Firm* — Stephen J. Weyer, Esq.; Stites & Harbison, PLLC

(57) ABSTRACT

A first elastic member is interposed between an outer peripheral surface of the circular core back portion and an inner wall surface of the second motor housing in a radial direction, both outer peripheral ends of the core back portion in the axial direction of the rotor are covered with the first elastic member, the first elastic member is assembled by being pinched between end surfaces of the first motor housing and the second motor housing which faces each other, and a second elastic member is assembled by being stacked between the bearing assembled in one of the pair of bearing housings and the bearing housing.

2 Claims, 1 Drawing Sheet

(51) Int. Cl.

| | |
|---|---|
| *F04D 29/42* | (2006.01) |
| *H02K 5/173* | (2006.01) |
| *H02K 7/04* | (2006.01) |
| *H02K 7/08* | (2006.01) |
| *F04D 29/28* | (2006.01) |
| *H02K 1/18* | (2006.01) |
| *F04D 25/06* | (2006.01) |
| *F04D 29/66* | (2006.01) |
| *F04D 17/16* | (2006.01) |

(52) U.S. Cl.
CPC ....... *F04D 29/281* (2013.01); *F04D 29/4206* (2013.01); *F04D 29/668* (2013.01); *H02K 1/185* (2013.01); *H02K 5/1732* (2013.01); *H02K 7/04* (2013.01); *H02K 7/083* (2013.01); *F04D 17/16* (2013.01)

(56) References Cited

U.S. PATENT DOCUMENTS

| | | | | |
|---|---|---|---|---|
| 2010/0059056 A1* | 3/2010 | Sears | ..................... | H02K 7/083 |
| | | | | 310/90 |
| 2012/0183422 A1* | 7/2012 | Bahmata | ................ | H02K 1/185 |
| | | | | 417/423.15 |
| 2015/0061429 A1* | 3/2015 | Sakai | ....................... | H02K 9/06 |
| | | | | 310/63 |

* cited by examiner

BLOWER

CROSS-REFERENCE TO RELATED APPLICATION

This application is a continuation-in-part application of U.S. patent application Ser. No. 15/863,173 filed on Jan. 5, 2018, which in turn is based upon and claims the benefit of priority of the prior Japanese Patent Application No. 2017-018694, filed on Feb. 3, 2017, and the entire of all contents of which are incorporated herein by reference.

TECHNICAL FIELD

The present invention relates to a motor used for continuous positive airway press (CPAP), for example, and a blower including the motor.

BACKGROUND ART

As components constituting the motor, there are a rotor, a stator, a bearing, a motor housing, and the like. For example, in an inner rotor type motor, an outer diameter portion of a stator core of the stator is fixed to the motor housing. In addition, the rotor is rotatably supported to the motor housing via a bearing component.

In such a motor structure, both vibration caused by a magnetic attraction force of the stator and the rotor and vibration related to the rotor and the bearing are transmitted to the motor housing. In addition, the vibration transmitted to the motor housing increases as a rotational speed of the motor increases.

As a countermeasure to this problem, the assembled motor is subjected to vibration-proof measures such as wrapping or hanging with elastic components or the like and then is assembled into a product. For example, in order to suppress a creep phenomenon of the bearing supporting the rotor, a tubular cap made of an elastic body is mounted on an outer peripheral portion of a ball bearing fitted in the ball housing provided with a through hole. A protrusion corresponding to the through hole is provided on an inner peripheral surface of the cap. A technique of suppressing the rotation of an outer ring by fitting the protrusion into the through hole at the outer peripheral portion of the ball housing to mount the cap such that the protrusion presses the outer ring of the ball bearing is proposed (see PTL 1: JP-A-2003-250245).

SUMMARY OF INVENTION

Technical Problem

If the motor described above is provided with vibration-proof measures, when the motor is wrapped with an elastic component, the outer diameter of the motor and the blower for assembling the motor becomes large, and if the motor is hung with an elastic component, the product shape becomes large since a space for vibration-proof is required.

In addition, in PTL 1, since a cap made of an elastic body is mounted on the outer peripheral portion of the ball housing, although the vibration between the rotor and the bearing is attenuated to some extent, the driving between the stator and the rotor is transmitted to the motor housing (bracket) and thus is likely to be noisy.

Solution to Problem

The present invention has been made to solve these problems and an object thereof is to provide a motor of which vibration is unlikely to be transmitted to a motor housing and a blower which is provided with the motor and realizes the noise reduction by providing a vibration-proof structure between a stator, a rotor, and a bearing in the motor housing.

In order to achieve the above object, the present invention has the following configurations.

There is provided a motor including: a motor housing being formed by assembling a first motor housing and a second motor housing; a stator that has a stator core integrally assembled in the motor housing; a pair of bearing housings that are concentrically disposed in a center hole of the stator core surrounded by pole teeth protruding inward from a circular core back portion in the radial direction, are respectively integrally assembled with the stator core from both end surfaces in an axial direction of a rotor, and have a tubular shape; and a rotor in which a rotor shaft is rotatably supported via bearings respectively inserted into the pair of bearing housings with adhering an inner ring to the rotor shaft and adhering an outer ring to the bearing housings, and a first elastic member is interposed between an outer peripheral surface of the core back portion of the stator core and an inner wall surface of the second motor housing in a radial direction, an outer peripheral surface of the core back portion is covered with the first elastic member, the first elastic member is assembled by being pinched between end surfaces of the first motor housing and the second motor housing which faces each other in a state where both ends of the first elastic member extended in an axial direction of the rotor shaft are bent in an L-shape along the core back portion, a second elastic member is assembled by being stacked between the bearing assembled in one of the pair of bearing housings and the bearing housing.

According to the above configuration, the pair of bearing housings are concentrically disposed in the center hole of the stator core surrounded by the pole teeth protruding inward from the circular core back portion in the radial direction, are respectively integrally assembled with the stator core from both end surfaces in the axial direction of the rotor, and have the tubular shape, and the rotor shaft of the rotor is rotatably supported via the bearings respectively inserted into the pair of bearing housings with adhering the inner ring to the rotor shaft and adhering the outer ring to the bearing housings. With this structure, the bearing housings are integrally assembled to the stator core, not to the motor housing, so that vibration is unlikely to be transmitted directly from the bearing to the motor housing and a vibration transmission route is serially limited, i.e., from the rotor to the motor housing via the stator.

Further, the first elastic member is interposed between the outer peripheral surface of the circular core back portion and the inner wall surface of the second motor housing in the radial direction, the both outer peripheral ends of the core back portion in the axial direction of the rotor are covered with the first elastic member, the first elastic member is assembled by being pinched between the end surfaces of the first motor housing and the second motor housing which faces each other, and the second elastic member is assembled by being stacked between the bearing assembled in one of the pair of bearing housings and the bearing housing.

Accordingly, since the first elastic member and the second elastic member are provided in the serial vibration transmission route from the rotor to the housing, rotational vibration of the rotor and vibration of the stator are unlikely to be transmitted to the motor housing.

A second elastic member may be a coil spring interposed between the bearing housing and the bearing in a state of being compressed to be shorter than a natural length thereof.

Accordingly, pre-load can be applied to the bearings rotating at high speed to lengthen the service life thereof.

As the second elastic member, although there are a wave washer, a leaf spring, a disc spring, a coil spring and the like, in the elastic member for CPAP using a small ball bearing at high-speed rotation, it is more preferable that the coil spring is compressed to be shorter than a natural length thereof and interposed because it gives less variation in the pre-load than that the wave washer gives and therefore load can be stably applied in the axial direction.

There is provided a blower including: an annular air blowing path that is formed by integrally assembling a first recessed groove, which is constituted by recessed surface portions respectively formed in an outer periphery of the above described first motor housing and an outer periphery of a blower housing covering the first motor housing in a state where the recessed surface portions are continuously formed and which has a semicircular section, and a second recessed groove, which is formed in an outer periphery of the second motor housing and which has a recessed surface portion and a semicircular section, wherein the recessed surface portions of the first recessed groove and the recessed surface portion of the second recessed groove face each other, and an impeller that is integrally assembled with the rotor shaft extended to the blower housing.

With this structure, vibration of the motor housing is less likely to be transmitted to the blower housing, and therefore noise reduction can be realized.

Advantageous Effects of Invention

By providing the first elastic member and the second elastic member in the serial vibration transmission route from the rotor to the motor housing via the stator, it is possible to provide the motor in which the rotational vibration of the rotor and the vibration of the stator are less likely to be transmitted to the motor housing.

In addition, since the motor housing is unlikely to be vibrated, it is difficult for the vibration to be transmitted to the blower housing so that it is possible to provide a blower that realizes noise reduction.

DESCRIPTION OF EMBODIMENTS

Hereinafter, one embodiment of a motor and a blower according to the invention will be described with reference to the attached drawings. First, a schematic configuration of a motor will be described with reference to FIG. 1. As the motor, a DC brushless motor is used, and in this example, an inner rotor type motor is used.

Figure 1:
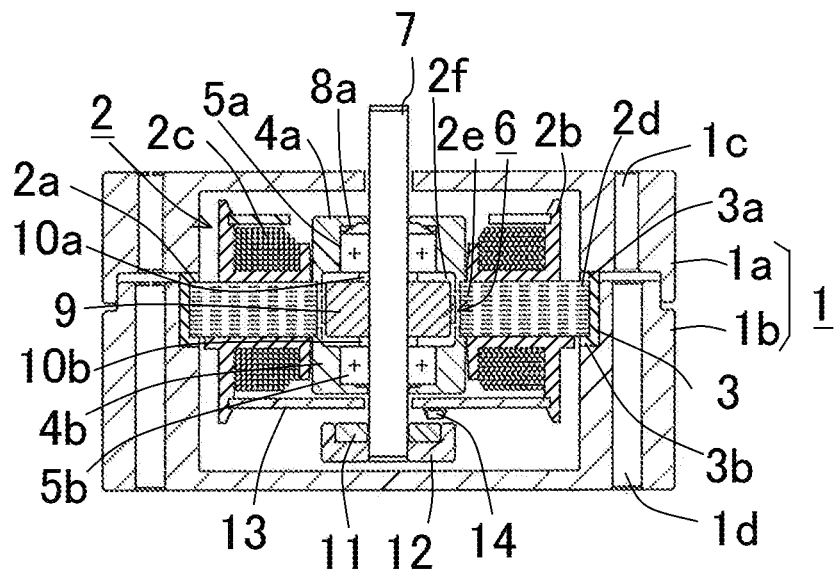
FIG. 1 is a sectional view of a motor.

As illustrated in FIG. 1, a motor housing 1 is integrally assembled by combining a first motor housing 1a and a second motor housing 1b and screwing a bolt (not illustrated) into threaded holes 1c, 1d communicating with each other. As the motor housing 1, stainless steel (SUS), aluminum material, or the like is used.

The stator 2 is assembled in the motor housing 1. The stator 2 includes a stator core 2a, an insulator 2b which covers both end surfaces of the stator core 2a, and a coil 2c which has a magnet wire wound around pole teeth 2e via the insulator 2b. As the stator core 2a, a laminated core is used in which a plurality of electromagnetic steel plates are laminated and caulked. In the stator core 2a, a plurality of pole teeth 2e are formed inward from an annular core back portion 2d in the radial direction. The stator core 2a is integrally fixed to an inner wall surface of the second motor housing 1b with the first elastic member 3 interposed between an outer peripheral surface of the core back portion 2d and the stator core. The first elastic member 3 is assembled by being pinched between end surfaces of the first motor housing 1a or the second motor housing 1b which faces each other in a state where both ends 3a, 3b of the first elastic member 3 extended in an axial direction of the rotor shaft are bent in an L-shape along the core back portion 2d of the stator core 2a. As the first elastic member 3, a rubber sheet, an elastomeric resin or the like is used.

This makes it difficult for the vibration of the stator 2 to be transmitted to the motor housing 1.

In addition, a pair of bearing housings 4a, 4b formed in a tubular shape are fixed by press-fitting or adhesion from both end surfaces in the center hole 2f surrounded by the pole teeth 2e protruding inward of the stator core 2a in the radial direction. Since a non-magnetic metal material (for example, aluminum, non-magnetic stainless steel, or the like) is used for the bearing housings 4a, 4b and the bearing housings 4a, 4b is press-fitted to a magnetic flux acting surface of each pole tooth 2e, the press-fitting amount thereof is adjusted to the minimum necessary. If the press-fitting amount of the bearing housings 4a, 4b to the stator core 2a increases and thus the magnetic flux generated on the magnetic flux acting surface of the pole teeth 2e is disturbed, eddy currents are generated and the motor performance may be deteriorated. Bearings 5a, 5b (ball bearings) are inserted into the cylindrical holes of the bearing housings 4a, 4b, respectively, and the inner and outer rings are adhered and fixed. For details, the inner ring is adhered to the rotor shaft 7, and the outer rings are respectively adhered to the bearing housings 4a, 4b. With this structure, a vibration transmission route from the rotor 6 to the motor housing 1 via the stator 2 is serially formed.

In the rotor 6, a rotor shaft 7 is rotatably supported via the bearings 5a, 5b inserted in the bearing housings 4a, 4b. A wave washer 8a (second elastic member) is interposed between the bearing housing 4a and the bearing 5a. Accordingly, it is possible to provide the motor in which the vibration of the rotor 6 is less likely to be transmitted to the stator 2. Further, a pre-load can be applied to the bearings 5a, 5b rotating at a high speed to lengthen the service life thereof.

In place of the wave washer 8a, although a leaf spring, a disc spring or the like may be used, in a case of CPAP using a small ball bearing at high-speed rotation, it is more preferable that the coil spring 8b (see FIG. 2) is compressed to be shorter than a natural length thereof and interposed therebetween because it gives less variation in the pre-load than that the wave washer 8a gives and therefore load can be stably applied in the axial direction.

A rotor magnet 9 is concentrically assembled to the rotor shaft 7. The rotor shaft 7 is inserted into the bearings 5a, 5b assembled to the bearing housings 4a, 4b, and the rotor magnet 9 is disposed facing the pole teeth 2e of the stator core 2a and assembled. Spacers 10a, 10b are provided between the rotor magnet 9 and the bearings 5a, 5b.

In addition, one end of the rotor shaft 7 extends to the outside from the first motor housing 1a and serves as an output side. In addition, a sensor magnet 11 and a balancer 12 are integrally assembled to the other end of the rotor shaft 7 on the side of the second motor housing 1b. The sensor magnet 11 detects a rotor magnetic pole position and is magnetized in the same phase as the rotor magnet 9 in the peripheral direction. The balancer 12 is used as a back yoke of the sensor magnet 11 or as a counterbalance correcting material of an impeller described below.

A motor substrate 13 provided with a motor drive circuit is supported on the insulator 2b. A lead wire drawn from the coil 2c is connected to the motor substrate 13. In addition, a magnetic pole detection sensor 14 (Hall IC or the like) is provided on the surface of the motor substrate 13 facing the sensor magnet 11. By detecting the magnetic pole position of the sensor magnet 11 with the magnetic pole detection sensor 14, the rotational position of the rotor magnet 9 is detected and the direction of current flow to the coil 2c is switched.

As described above, the stator core 2a is integrally assembled to an inner wall surface of the second motor housing 1b via the elastic member 3 in the radial direction, the rotor shaft 7 is integrally assembled in the bearing housing 4a via the bearing 5a, and the rotor 6 is rotatably supported between the bearing 5a and the bearing housing 4a via a second elastic member (wave washer 8a) in the axial direction.

According to the above configuration, the first elastic member 3 is interposed between the outer peripheral surface of the circular core back portion 2d and the inner wall surface of the second motor housing 1b in the radial direction, the both outer peripheral ends of the core back portion 2d in the axial direction of the rotor are covered with the first elastic member 3, the first elastic member 3 is assembled by being pinched between the end surfaces of the first motor housing 1a and the second motor housing 2b which faces each other, and the second elastic member 8a is assembled by being stacked between the bearing 5a assembled in the bearing housing 4a and the bearing housing 4a.

By providing the first elastic member 3 and the second elastic member 8a in the serial vibration transmission route from the rotor 6 to the motor housing 1 via the stator 2, it is possible to provide the motor in which the rotational vibration of the rotor 6 and the vibration of the stator 2 are less likely to be transmitted to the motor housing 1.

Figure 2:
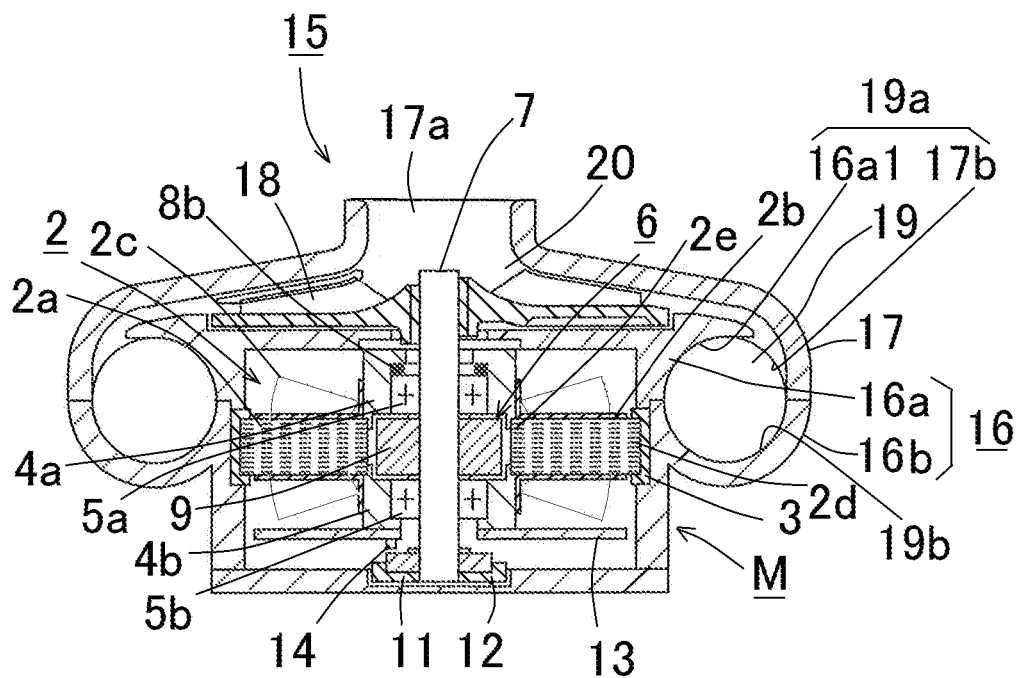
FIG. 2 is a sectional view of a blower.

FIG. 2 illustrates a configuration example of a blower 15 provided with a motor M similar to FIG. 1. Since the internal structure of the motor M is the same as that illustrated in FIG. 1, different configurations will be mainly described. The blower 15 is supposed to be a blower for CPAP.

A motor M is accommodated in the motor housing 16 (first motor housing 16a and second motor housing 16b). Alternatively, an impeller 18 is accommodated in a blower chamber 20 surrounded by the first motor housing 16a and the blower housing 17. A recessed surface portion 16a1 is formed in an outer periphery of the first motor housing 16a and directed downward, and a recessed surface portion 17b, which communicates to the recessed surface portion 16a1, is formed in an outer periphery of the blower housing 17 covering the first motor housing 16a and directed downward. A first recessed groove 19a, which has a semicircular section and is directed downward, is constituted by the recessed surface portion 16a1 and the recessed surface portion 17b, which are continuously formed and communicate to each other. Further, a second recessed groove 19b, which has a semicircular section and is directed upward, is formed in an outer periphery of the second motor housing 16b. The first recessed groove 19a, which is formed in the outer peripheries of the first motor housing 16 and the blower housing 17, and the second recessed groove 19b, which is formed in the outer periphery of the second motor housing 16b, are combined, in a state where their recessed surface portions face each other, so as to form an annular air blowing path 19. A suction port 17a for adsorbing the fluid in the axial direction is formed in a central portion of the blower housing 17 and the fluid is pressurized in the circumferential direction by the impeller 18 so as to circulate around the air blowing path 19 and is discharged.

The stator core 2a has an elastic member 3 interposed between the outer peripheral surface of the core back portion 2d and the inner wall surface of the second motor housing 16b so that the stator core 2a is interposed between the end surfaces of the second motor housing 16b and the first motor housing 16a which faces each other and fixed integrally. Accordingly, the vibration between the stator 2 and the rotor 6 can be unlikely to be transmitted to the motor housing 16.

In addition, a coil spring 8b (second elastic member) is interposed between the bearing housing 4a and the bearing 5a in a state of being compressed to be shorter than a natural length thereof. Accordingly, it is possible to provide the motor in which the vibration of the rotor 6 is less likely to be transmitted to the stator 2, and it is possible to extend the service life thereof by applying a stable pre-load to the bearings 5a, 5b rotating at a high speed (because variation in applied pre-load is small).

Therefore, by providing the first elastic member 3 and the second elastic member 8a in the serial vibration transmission route from the rotor 6 to the motor housing via 1 the stator 2, the rotational vibration of the rotor 6 and the vibration of the stator 2 can be unlikely to be transmitted to the motor housing 16.

The impeller 18 is assembled to one end of the rotor shaft 7 which extends outward from the first motor housing 16a and enters the blower chamber 20 side. In addition, the sensor magnet 11 and the balancer 12 are integrally assembled to the other end of the rotor shaft 7 in the second motor housing 16b. The balancer 12 is the back yoke of the sensor magnet 11 and functions as a counterweight of the impeller 18.

When the motor M is started, the impeller 18 of the blower 15 is rotated, and the fluid adsorbed from the suction port 17a into the blower housing 17 in the axial direction by the rotation of the impeller 18 circulates the air blowing path 19, is pressurized, and compressed air is delivered from the discharge port (not illustrated).

According to the configuration described above, since the vibration of the motor housing 16 can be reduced, vibration is unlikely to be transmitted to the blower housing 17 and noise reduction can be realized.

Although the example has been described using the inner rotor type motor, if the stator core can be integrally assembled with the elastic member interposed between the stator core and the outer wall surface of the motor housing (bearing housing) in a radial direction, outer rotor type motors can also be applied.

What is claimed is:
1. A blower comprising:
a motor housing being formed by assembling a first motor housing and a second motor housing;
a stator that has a stator core integrally assembled in the second motor housing;
a pair of bearing housings that are concentrically disposed in a center hole of the stator core surrounded by pole teeth protruding inward from a circular core back portion in a radial direction, are respectively integrally assembled with the stator core from both end surfaces in an axial direction of a rotor, and have a tubular shape;

a motor having the rotor in which a rotor shaft is rotatably supported via bearings respectively inserted into the pair of bearing housing by adhering an inner ring to the rotor shaft and adhering an outer ring to the bearing housings;

an annular air blowing path that is formed by integrally assembling a first recessed groove, which is constituted by recessed surface portions respectively formed in an outer periphery of the first motor housing and an outer periphery of a blower housing covering the first motor housing in a state where the recessed surface portions are continuously formed and which has a semicircular section, and a second recessed groove, which is formed in an outer periphery of the second motor housing and which has a recessed surface portion and a semicircular section, wherein the recessed surface portions of the first recessed groove and the recessed surface portion of the second recessed groove face each other; and an impeller that is integrally assembled with the rotor shaft the rotor shaft extending into the blower housing, wherein a first elastic member is interposed between an outer peripheral surface of the core back portion of the stator core and an inner wall surface of the second motor housing in the radial direction, the outer peripheral surface of the core back portion is covered with the first elastic member, the first elastic member is assembled by being pinched between end surfaces of the first motor housing and the second motor housing which face each other in a state where both ends of the first elastic member extended in the axial direction of the rotor shaft are bent in an L-shape along the core back portion, a second elastic member is assembled by being stacked between the bearing assembled in one of the pair of bearing housings and the bearing housing.

2. The blower according to claim 1, wherein the second elastic member is a coil spring interposed between the bearing housing and the bearing in a state of being compressed to be shorter than a natural length thereof.

\* \* \* \* \*